(12) United States Patent
Nagy et al.

(10) Patent No.: US 7,828,687 B2
(45) Date of Patent: Nov. 9, 2010

(54) MODULAR PLANETARY GEAR ASSEMBLY AND DRIVE

(75) Inventors: Attila Nagy, Mályi (HU); Balazs Palfai, Budapest (HU)

(73) Assignee: Remy Technologies, L.L.C., Anderson, IN (US)

( * ) Notice: Subject to any disclaimer, the term of this patent is extended or adjusted under 35 U.S.C. 154(b) by 712 days.

(21) Appl. No.: 11/585,960

(22) Filed: Oct. 25, 2006

(65) Prior Publication Data
US 2008/0103016 A1 May 1, 2008

(51) Int. Cl.
*F16H 3/62* (2006.01)
(52) U.S. Cl. .................................... 475/275
(58) Field of Classification Search ........... None
See application file for complete search history.

(56) References Cited

U.S. PATENT DOCUMENTS

| | | | |
|---|---|---|---|
| 18,829 A | 12/1857 | Vanderwerken | |
| 76,901 A | 4/1868 | Fithian | |
| 80,968 A | 8/1868 | Jones | |
| 388,415 A | 8/1888 | Hewins | |
| 476,101 A | 5/1892 | Thomson | |
| 1,138,968 A | 5/1915 | Neill | |
| 1,151,381 A | 8/1915 | Olson | |
| 1,350,822 A | 8/1920 | McNitt | |
| 1,431,167 A | 10/1922 | McCollum | |
| 1,644,222 A | 10/1927 | Baker | |
| 1,687,077 A | 10/1928 | Baker | |
| 1,820,061 A | 8/1931 | Flagg | |
| 2,529,330 A | 11/1950 | Double | |
| 2,591,967 A | 4/1952 | Ridgely et al. | |
| 2,826,095 A | 3/1958 | Dirzius et al. | |
| 3,116,651 A | 1/1964 | Hardy | |
| 3,241,392 A * | 3/1966 | Hardy | 74/462 |
| 3,421,390 A | 1/1969 | Lohr | |
| 3,472,083 A | 10/1969 | Schnepel | |
| 5,580,327 A | 12/1996 | Deriaz | |
| 5,679,089 A | 10/1997 | Levedahl | |
| 5,685,798 A | 11/1997 | Lutz et al. | |
| 6,132,330 A | 10/2000 | Leggett | |
| 6,547,689 B2 | 4/2003 | Baker, Jr. | |
| 6,676,558 B2 | 1/2004 | Fütterer | |
| 6,743,148 B2 | 6/2004 | Hayabuchi et al. | |
| 6,866,608 B2 | 3/2005 | Shirasawa | |
| 6,974,401 B2 | 12/2005 | O'Leary et al. | |
| 2002/0151405 A1 | 10/2002 | Futterer | |
| 2003/0036455 A1 | 2/2003 | Ushikoshi | |

(Continued)

FOREIGN PATENT DOCUMENTS

JP    2-21048    1/1990

(Continued)

*Primary Examiner*—Dirk Wright
(74) *Attorney, Agent, or Firm*—Finnegan, Henderson, Farabow, Garrett & Dunner

(57) ABSTRACT

An apparatus and method for a planetary gear assembly and drive is provided. The planetary gear assembly and drive has a space index of 60 and includes at least one planet gear with 15 teeth. The gear assembly and drive is capable of employing 1, 2, 3, 4, or 5 planet gears and if multiple planet gears are employed, they are equally spaced about the circumference of the sun gear. The planetary gear assembly and drive further achieves a low frequency of tooth reconnection.

21 Claims, 3 Drawing Sheets

U.S. PATENT DOCUMENTS

| | | |
|---|---|---|
| 2003/0153427 A1 | 8/2003 | Mayranen |
| 2003/0232692 A1 | 12/2003 | Chen |
| 2004/0259679 A1 | 12/2004 | Becquerelle et al. |
| 2005/0014594 A1 | 1/2005 | Degen et al. |
| 2005/0020401 A1 | 1/2005 | Ando et al. |
| 2005/0090364 A1 | 4/2005 | Lee et al. |
| 2005/0192151 A1 | 9/2005 | Simon |
| 2005/0192152 A1 | 9/2005 | Kimes |
| 2005/0245348 A1 | 11/2005 | Liu |

FOREIGN PATENT DOCUMENTS

| | | |
|---|---|---|
| JP | 2-163547 | 6/1990 |
| JP | 3-121337 | 5/1991 |
| JP | 3-239841 | 10/1991 |
| JP | 4-50538 | 2/1992 |

* cited by examiner

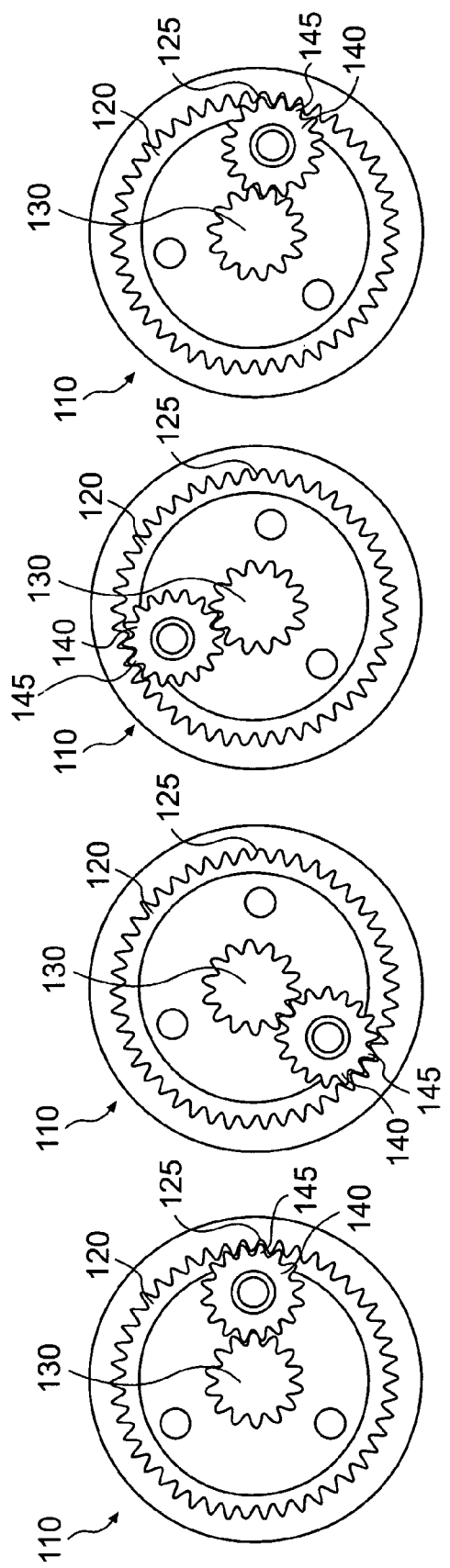

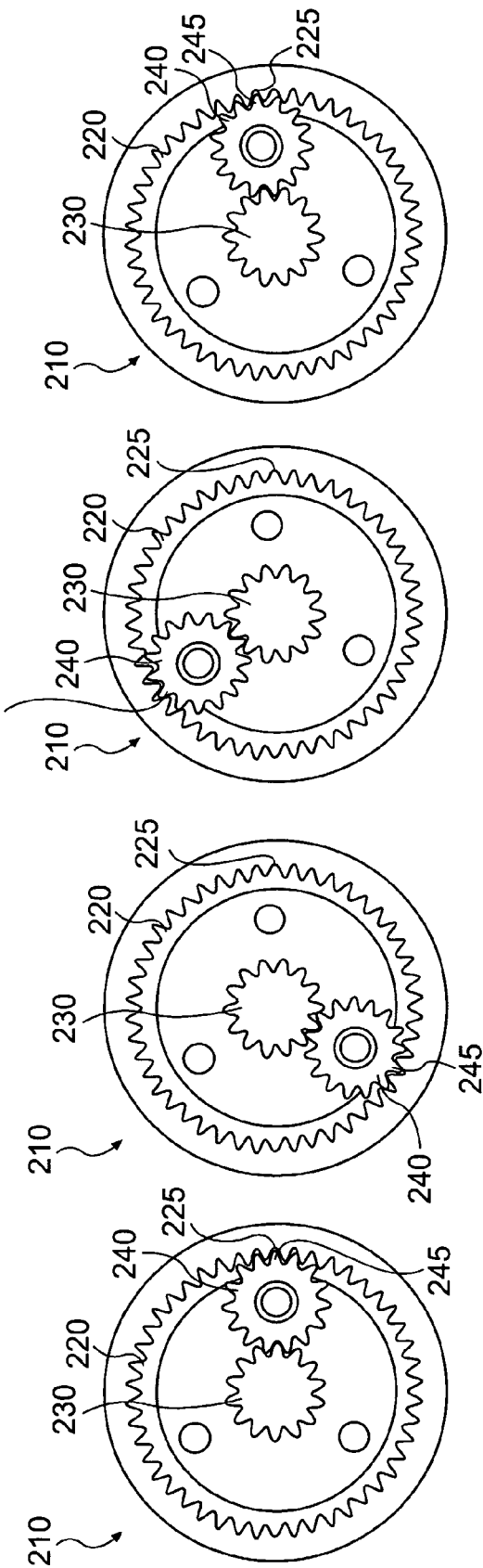

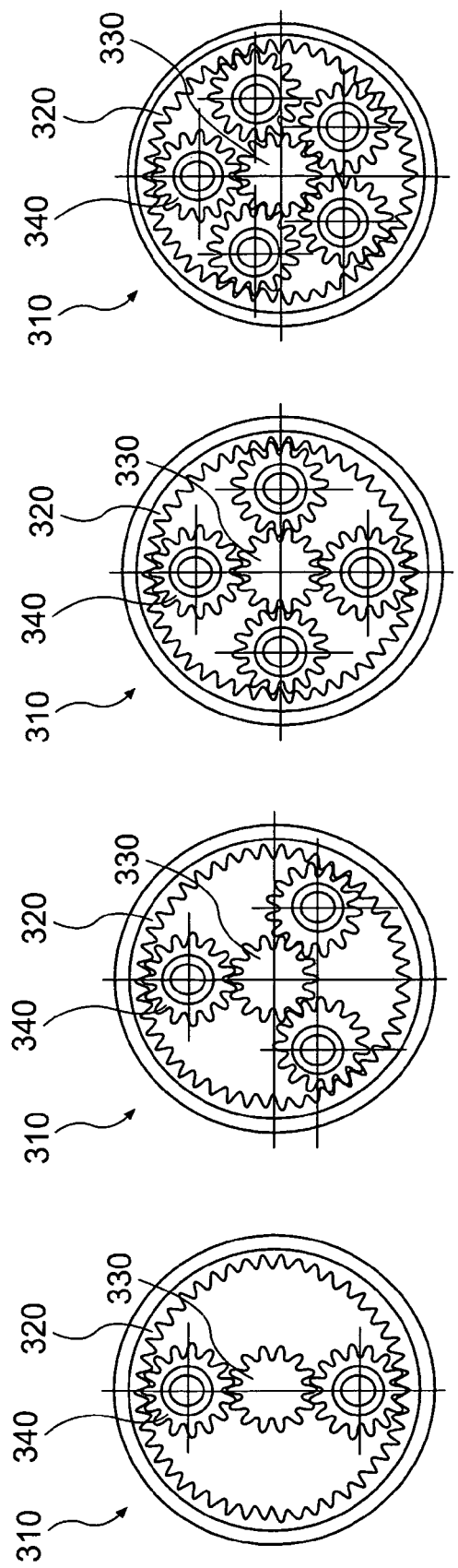

MODULAR PLANETARY GEAR ASSEMBLY AND DRIVE

TECHNICAL FIELD

The present disclosure relates generally to an apparatus and method for a planetary gear assembly and drive, and more particularly, to an apparatus and method for a planetary gear assembly and drive capable of employing 1, 2, 3, 4, or 5 planetary gears and having a space index of 60.

BACKGROUND

It is well known in the art that a simple planetary gear assembly has an outer ring gear, a sun gear, planet gears intermeshing with the sun and outer ring gears, and a carrier for revolvably supporting the planet gears. In such arrangements, only a predetermined number of standard planet gears can be equally spaced between certain sizes of outer ring and sun gears. The predetermined number is determined by the space index. The sum of the number of teeth on the outer ring ("R") and the number of teeth on the sun gear ("S") is the space index. According to general principles of planetary gear design, the number of planet gears that may be used should be a whole number factor of the space index. Otherwise, equally spacing the planet gears around the circumference of the sun gear would not be possible. If the number of planet gears disposed around the sun gear is not a whole number factor of the space index, the planet gears cannot be equally spaced about the circumference of the sun gear. Unequally spaced planets cause problems such as, for example, uneven loading.

In addition, planetary gear assembly designs generally follow the tooth number correlation formula, namely that the number of teeth on the planet gear should equal the difference between the number of teeth on the outer ring gear and the number of teeth on the sun gear, divided by two (i.e., No. of Planet Teeth=(R−S)/2). This can result in frequent tooth reconnection and can restrict the number of planet gears that can be equally spaced about the circumference of a sun gear.

Some apparatus and methods have been developed to equally space planet gears around the circumference of a sun gear although the number of planet gears disposed around the circumference of the sun gear is not a whole number factor of the space index. One such method is described in U.S. Pat. No. 3,116,651 (the "'651 patent") issued to Hardy. The '651 patent describes a method for equally spacing planet gears around the circumference of a sun gear using planet gears with different numbers of teeth. The method further alters the tooth shape of the planet gears to ensure meshing.

Although the method of the '651 patent may provide a mechanism to equally space planet gears around the circumference of a sun gear even though the number of planet gears may not be a whole number factor of the space index, altering the tooth profiles of planets to ensure meshing compromises gear kinematics.

The invention, as represented by the disclosed embodiments, for example, is directed to overcoming one or more of the problems set forth above.

SUMMARY OF THE INVENTION

In one aspect, the disclosed embodiments are directed to a planetary gear assembly having an outer ring gear, a sun gear, and at least one planet gear with 15 teeth, the at least one planet gear being in mesh with the sun gear and outer ring gear. The planetary gear assembly further has a space index of 60.

In another embodiment, a method of assembling a planetary gear is provided. The method includes equally spacing a plurality of planet gears, each having 15 teeth, about the circumference of a sun gear. The method further includes meshing the planet gears with an outer ring gear and the sun gear.

In yet another embodiment a planetary gear drive is provided. The gear drive includes a plurality of planet gears in mesh with an outer ring gear and a sun gear. The gear drive is further capable of employing 1, 2, 3, 4, or 5 planet gears. The speed ratio of the gear drive remains constant regardless of the number of planet gears employed.

It is to be understood that both the foregoing general description and the following detailed description are exemplary and explanatory only and are not restrictive of the invention as claimed.

BRIEF DESCRIPTION OF THE DRAWINGS

FIGS. 1A-D illustrate a conventional planetary gear assembly;

FIGS. 2A-D depict a planetary gear assembly consistent with certain disclosed embodiments; and FIGS. 3A-D illustrate a planetary gear drive consistent with certain disclosed embodiments, employing 2, 3, 4, or 5 planet gears.

DETAILED DESCRIPTION

As depicted in FIG. 1, conventional planetary gear set 110 includes an outer ring gear 120, a sun gear 130, and at least on planet gear 140. The outer ring gear 120 has 46 teeth the sun gear 130 has 14 teeth and the planet gear has 16 teeth. Thus, planetary gear set 110 follows the general principle of tooth number correlation, namely, that the number of teeth on the planet gear should equal the difference between the number of teeth on the outer ring gear and the number of teeth on the sun gear divided by two (i.e., No. of Planet Teeth (16)=(R (46)−S(14))/2).

As further shown in FIG. 1A, before rotation of planetary gear assembly 110, tooth 145 of planet gear 140 may mesh with tooth 125 of outer ring gear 120. FIGS. 1A to 1D show the progression of tooth 145 as it revolves around the circumference of the sun gear. As shown in FIG. 1D, after one complete rotation (i.e., one drive shaft turn) of the planet gear, tooth 145 of the planet gear 140 will have advanced by two teeth with respect to tooth 125 of the outer ring gear 120. Based on this construction, tooth 145 of planet gear 140 and tooth 125 of outer ring gear 120 would reconnect (or re-mesh) after 23 rotations (or 23 drive shaft turns).

The speed ratio of the planetary gear set can be determined by the formula: 1+R/S, where, as before, R and S represent the numbers of teeth on the outer ring and sun gears, respectively. The speed ratio for the planetary gear set shown in FIG. 1 is 4.286 (i.e., 1+46/14).

The space index for the gear sets depicted in FIGS. 1A-D is 60. That is, the number of teeth on the outer ring 46 plus the number of teeth on the sun ring 14 (i.e., Space Index (60)=(R (46)+S(14)). Thus, either 2, 3, 4, or 5 planets may be disposed around the circumference of the sun gear.

FIG. 2 shows a planetary gear set 210 that can also employ and outer ring gear 220 having 46 teeth and a sun gear 230 having 14 teeth. However, the planet gear 240 has only 15 teeth as opposed to the required 16 needed to satisfy the formula for tooth number correlation. That is, upon calculating the tooth number correlation formula where No. of Planet Teeth (16)=R(46)−S(14)/2, a modified No. of Planet teeth is calculated such that the modified No. of Planet teeth Pm(15) =P(16)−1. Therefore, Pm=((R(46)−S(14))/2)−1. In other words, to satisfy the tooth number correlation formula, either the plant gear should have 16 teeth, as in the conventional design depicted in FIG. 1, or the outer ring gear 220 should have 44 teeth.

Sun gear 230 can have 14 teeth and planet gear 240 can have 15 teeth. Two extra teeth can be added to outer ring gear 220 of planetary gear assembly 210 to make it 46 teeth, as opposed to 44, which would not satisfy the tooth number correlation formula.

As shown in FIG. 2A, before rotation of planetary gear set 210, tooth 245 of planet gear 240 can be in mesh with tooth 225 of outer ring gear 220. After one complete rotation (i.e., one drive shaft turn) of planet gear 240, tooth 245 of the planet gear would have delayed by one tooth with respect to tooth 225 of the outer ring gear. FIGS. 2A to 2D show the progression of the tooth as it revolves around the circumference of the sun gear. As shown in FIG. 2D, tooth 245 of planet gear 240 and tooth 225 of outer ring gear 220 reconnect after 46 rotations (or 46 drive shaft turns).

It should be noted that FIGS. 2A-D depict only one planet gear 240 disposed around the circumference of the sun gear 230 for simplicity and illustrative purposes only. The same principle applies if a plurality of planet gears are disposed around the circumference of the sun gear.

As noted above, the speed ratio of the planetary gear assembly can be determined by the formula: 1+R/S, where R and S represent the numbers of teeth on the outer ring and sun gears respectively. The speed ratio for the planetary gear assembly 210 shown in FIGS. 2A-D is thus also 4.286 (i.e. 1+46/14).

FIGS. 3A-D illustrate planetary gear drives that can utilize 2, 3, 4, or 5 planet gears disposed around the circumference of the sun gear. As noted, the number of planet gears that can be disposed around the circumference of the sun gear should be a whole number factor of the space index to ensure they are equally spaced. The space index for the gear sets depicted in FIGS. 3A-D is 60. That is, the number of teeth on the outer ring 46 plus the number of teeth on the sun ring 14. Thus, either 2, 3, 4, or 5 planets may be disposed around the circumference of the sun gear.

INDUSTRIAL APPLICABILITY

The disclosed embodiments may leverage the ability to utilize different numbers of planets with a gear drive design that may employ a constant speed ratio and may achieve a low frequency of tooth reconnection. Thus, the same parts may be used in several applications.

For example, because the planetary gear drive may utilize either 1, 2, 3, 4, or 5 planet gears, with those having multiple planet gears being equally spaced, the gear drive may be coupled to motors (not shown) of different sizes and ratings. Different size motors may share the same components by changing only the number of planet gears. In other words, the same outer ring gear and sun gear may be used in several applications by varying the number of planet gears as needed.

In another embodiment, a motor (not shown) for driving the sun gear or a motor (not shown) for driving a planet gear may remain the same as the planetary gear drive is employed in different applications by varying the number of planet gears. Motors of any size and rating may be employed. However, due to the compact size of certain disclosed embodiments, motors with power rating from 0.5 kilowatts to 2.5 kilowatts are particularly suited for this drive assembly.

In other embodiments, by achieving a low frequency of tooth reconnection, effects of manufacturing errors for a given tooth pair are reduced. For example, in one disclosed embodiment the same tooth reconnects after every 46 drive shaft turns, as opposed to, reconnecting after every 23 drive shaft turns if the tooth number correlation formula is followed. Thus, for this embodiment, effects of manufacturing errors for a given tooth pair would arise once every 46 drive shaft turns and not once every 23 drive shaft turns. This low frequency of tooth reconnection would therefore mitigate manufacturing errors for a given tooth pair.

It should be noted that the tooth number modification disclosed herein, where the numbers of teeth on the outer ring gear and the sun gear are kept constant while varying the number of teeth on the planet gear in violation of the tooth number correlation principle, may also be achieved by maintaining the number of teeth on the sun gear and planet gears and varying the number of teeth on the outer ring gear. However, by keeping the outer ring gear and sun gear constant and varying the planet gears, the speed ratio is kept the same. Consequently the same parts may be used interchangeably for different applications by varying the number of planet gears as required.

It will be apparent to those skilled in the art that various modifications and variations can be made to the apparatus and method for a planetary gear assembly and drive. Other embodiments will be apparent to those skilled in the art from consideration of the specification and practice of the disclosed apparatus and method for a planetary gear assembly and drive. It is intended that the specification and examples be considered as exemplary only, with a true scope being indicated by the following claims and their equivalents.

What is claimed is:

1. A planetary gear assembly comprising:
    an outer ring gear having R teeth;
    a sun gear having S teeth;
    at least one planet gear with Pm teeth where Pm=15 teeth, and where Pm=((R−S)/2)−1; and where the at least on planet gear is in mesh with the sun gear and outer ring gear; and
    having a space index of 60.

2. The gear assembly of claim 1, wherein the at least one planet gear includes a plurality of planet gears equally spaced about the circumference of the sun gear.

3. The gear assembly of claim 2, wherein the planet gears have the same number of teeth.

4. The gear assembly of claim 1, wherein the outer ring gear has 46 teeth.

5. The gear assembly of claim 1, wherein the sun gear has 14 teeth.

6. The gear assembly of claim 2, wherein each planet gear has 15 teeth.

7. The gear assembly of claim 2, wherein the plurality of planet gears comprises 2, 3, 4, or 5 planet gears.

8. The gear assembly of claim 2, wherein the outer ring gear has 46 teeth, the sun gear has 14 teeth, and each of the planet gears has 15 teeth.

9. A method of assembling a planetary gear comprising:
    equally spacing a plurality of planet gears, each having Pm teeth where Pm=15 teeth and where Pm=((R−S)/2)−1, about the circumference of a sun gear having S teeth; and
    meshing the planet gears with an outer ring gear having R teeth and the sun gear.

10. The method of claim 9, wherein the sun gear has 14 teeth.

11. The method of claim 9, wherein the outer ring gear has 46 teeth.

12. The method of claim 9, wherein the plurality of planet gears includes 2, 3, 4, or 5 planet gears.

13. A planetary gear drive comprising:
a plurality of planet gears having Pm teeth in mesh with a sun gear having S teeth and an outer ring gear having R teeth;
the gear drive capable of employing 2, 3, 4, or 5 planet gears;
a speed ratio of the gear drive remaining constant regardless of the number of the planet gears employed; and
where $Pm=((R-S)/2)+1$.

14. The planetary gear drive of claim 13, wherein the planet gears are equally spaced about the circumference of the sun gear.

15. The planetary gear drive of claim 13, wherein the planet gears have the same number of teeth.

16. The planetary gear drive of claim 13, wherein the outer ring gear has 46 teeth.

17. The planetary gear drive of claim 13, wherein the sun gear has 14 teeth.

18. The planetary gear drive of claim 13, wherein each planet gear has 15 teeth.

19. The planetary gear drive of claim 13, wherein the outer ring gear has 46 teeth, the sun gear has 14 teeth, and each of the planet gears has 15 teeth.

20. The planetary gear drive of claim 13, further comprising a motor to drive either one or more of the planet gears or the sun gear.

21. The planetary gear drive of claim 20, wherein the motor has a power rating from 0.5 kilowatts to 2.5 kilowatts.

* * * * *